United States Patent
McDonald et al.

(10) Patent No.: US 8,680,906 B1
(45) Date of Patent: Mar. 25, 2014

(54) HARDWARE BASED RANDOM NUMBER GENERATOR

(71) Applicant: United States Air Force, Rome, NY (US)

(72) Inventors: Nathan McDonald, Rome, NY (US); Joseph E. Van Nostrand, Gloversville, NY (US); Bryant T. Wysocki, Taberg, NY (US); Seann M. G. Bishop, Niskayuna, NY (US); Nathaniel C. Cady, Delmar, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/815,157

(22) Filed: Jan. 17, 2013

(51) Int. Cl.
*H03K 3/84* (2006.01)

(52) U.S. Cl.
USPC .......................... 327/164; 327/291

(58) Field of Classification Search
None
See application file for complete search history.

(56) References Cited

U.S. PATENT DOCUMENTS

2012/0105143 A1* 5/2012 Strachan et al. ............... 327/553
2012/0295398 A1* 11/2012 Kurunczi et al. ............. 438/104

\* cited by examiner

*Primary Examiner* — Cassandra Cox
(74) *Attorney, Agent, or Firm* — Joseph A Mancini

(57) ABSTRACT

Apparatus for generating a truly random binary bit value in which the resistance of memristive devices serve as the analogue bit values. Resistance values and the randomness by which they are generated stems from the inherently non-uniform, irreproducible variations in the materials of which the system is composed.

14 Claims, 5 Drawing Sheets

US 8,680,906 B1

HARDWARE BASED RANDOM NUMBER GENERATOR

BACKGROUND OF THE INVENTION

This invention relates generally to truly random number generation, and, more specifically, to hardware-based truly random number generation by means of memristive devices. This invention also relates to the field of physically unclonable functions and hardware identification.

Random number generation is used in all manners of systems today. Truly random number generators (TRNG) create series in which one value does not influence any subsequently generated value. Current non-quantum-based hardware TRNG rely on thermal noise in a resistor or avalanche noise from an avalanche diode to produce series values. In this way a series can never be deliberately replicated. However, these methods are often slow or required a significant amount of hardware.

It is frequently easier to use software based pseudo random number generators PRNG) which use a seed to generate numbers in a completely deterministic manner though statistically akin to numbers from TRNG. This method generates large series quickly, but is reproducible on any instance of the PRNG if the seed is known.

Unique hardware identification by means of physically unclonable functions (PUFs) is also of growing interest. This is currently performed using inherent variations in active device components, which add to the energy overhead of the system employing this technology. It is clearly desirable to provide means by which a truly random number can be generated and persist for future query in a passive medium. Random number generators described above cannot address this need under these constraints today. In the case of TRNG, the generated bit strings are irreproducible and thus cannot be identified with a unique hardware source. Whereas, for PRNG, the bit strings are reproducible on all instances of the PRNG and thus also cannot be tied to a unique system.

OBJECTS AND SUMMARY OF THE INVENTION

An optimal solution to the above described need involves memristive devices. A memristive device is essentially a two-terminal, non-volatile variable resistor. As such, it promises to revolutionize CMOS logic with respect to size, weight, and power by reducing the number of transistors required for memory and reconfigurable logic. Unlike the many processing steps required to fabricate a transistor, a memristive device may be composed of as few as three material layers, e.g. Al/CuO/Cu.

A typical memristive device has two critical resistance states, a high resistance state (HRS) and a low resistance state (LRS). To change a memristive device from the HRS to the LRS (termed a SET operation), a voltage bias of the appropriate polarity and magnitude, $V_{SET}$, must be applied to the device. In practice, a current limit is usually imposed upon the device during a SET; otherwise, the unchecked high current through the device will permanently establish an LRS by electrically breaking down the oxide. Once the device is in the LRS, it may be returned to the HRS via a RESET operation, typically by applying a lower voltage, $V_{RESET}$, but without the current limit.

It is therefore an object of the present invention to provide an apparatus that overcomes the prior art's inability to generate a persistent, passive hardware-based truly random number generator.

Briefly stated, the present invention achieves these and other objects through a lateral switching process with memristive devices. This invention generates a truly random binary bit, where the resistance of memristive devices serve as the analogue bit values. Said resistance values and the randomness by which they are generated stems from the inherently non-uniform, irreproducible variations in the materials of which the system is composed.

This invention consists of memristive devices. For purposes of illustration, a metal-insulator-metal (MIM) architecture will be described. For this invention, the bottom to electrode (BE) metal layer is in common between devices. The area of the top electrode (TE) defines the size of one memristive device. The resistance of each memristive device may be changed from a FIRS to a LRS by the application of a voltage bias on the TE and electrically grounding the common BE.

To generate a random bit, two memristive devices are set vertically (TE biased, BE grounded) to an LRS. This creates a low resistance filament between the TE and the BE through the insulator material layer. Next, the two memristive devices are RESET laterally, that is, one TE is biased and the other TE is grounded. During a RESET, the resistance value between the two memristive devices is returned to the HRS. In practice, only one of the low resistance filaments becomes highly resistive; the other filament remains of low resistivity. The location of this persistent low resistance filament is random with respect to the fabrication process.

By this means a truly random bit may be generated from two memristive devices, where one of the two memristive devices serves as the bit value. If the vertically measured resistance (TE biased, BE grounded) is an LRS (HRS), the bit is read as a logical "1" ("0"). The other memristor is of the opposite bit value and is ignored. Again, this bit is random since it cannot be determined ahead of time under which contact the persistent low resistance filament will occur. However, because the persistent low resistance filament location does not change for all subsequent cycles, the random bit is only random upon first use. Via this method two rows of N memristive devices will generate a random word of N bits length. It is in this manner that the present invention achieves both the truly random number generation and the passive persistence of this binary value.

Therefore, it is accurate to say that the present invention (1.) can be used to generate random numbers as binary bits and (2.) can retain these bit values in a passive medium for future queries allowing for unique identification of the hardware. As such, the present invention represents a significant departure from prior art methods.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
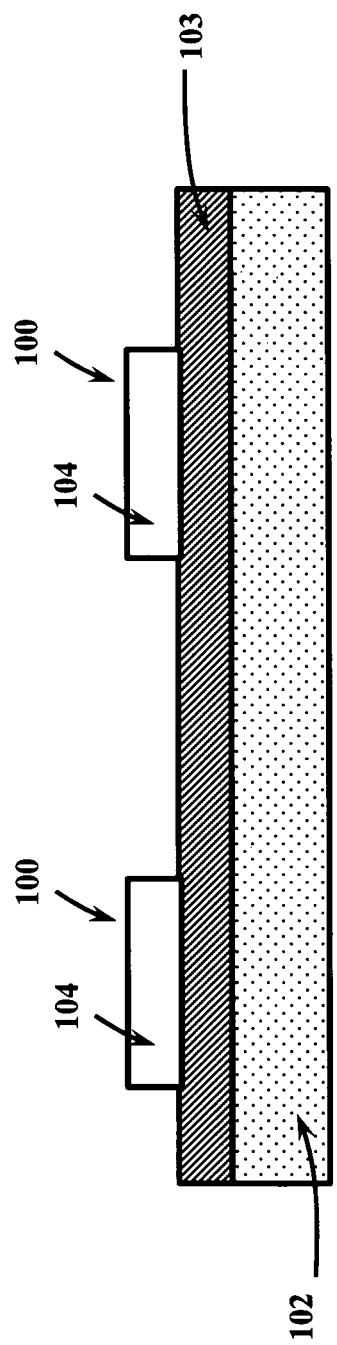
FIG. 1 is a schematic diagram representation of the present invention as initially fabricated.

Referring to FIG. 1, the key components of the one bit hardware-based random number generator include two previously unused memristive devices 100, which share at a minimum a common bottom electrode (BE) 102. For illustration purposes, metal-insulator-metal (MIM) memristive devices are depicted in FIGS. 1-5, though this invention need not be restricted to such an implementation. The insulator material 103 may be in common between the two memristive devices 100, but the top electrodes (TE) 104 must be discrete.

Figure 2:
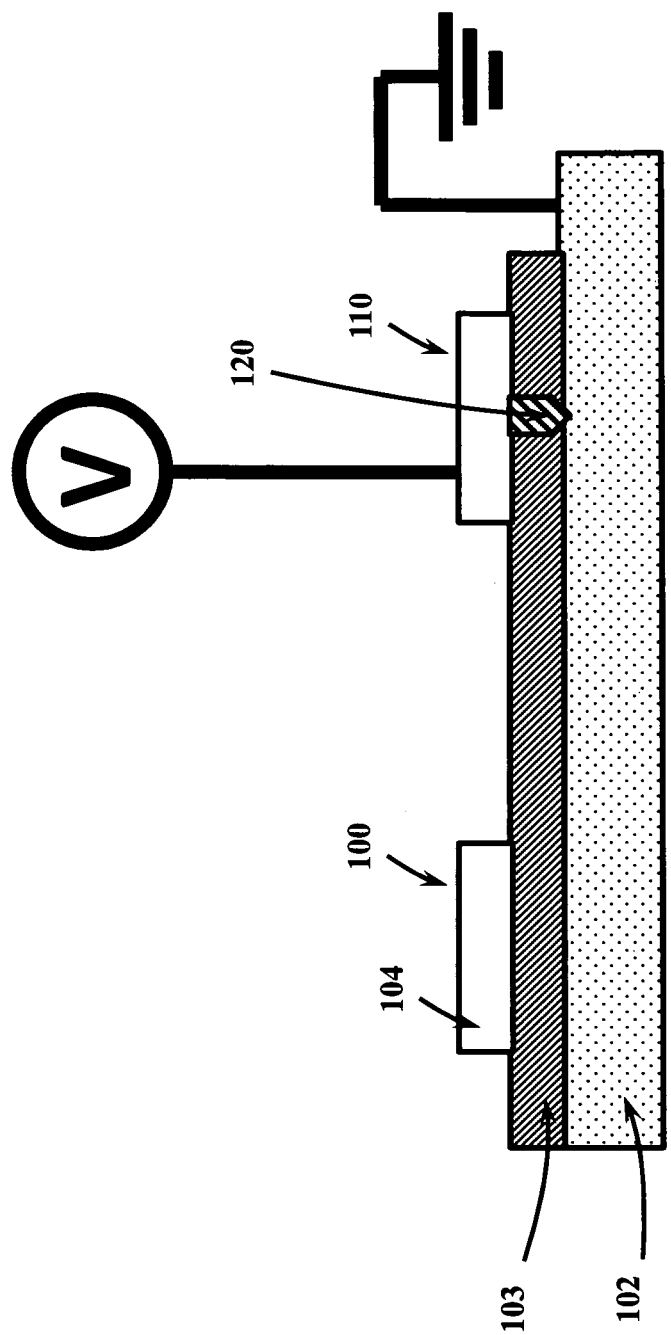
FIG. 2 is a schematic diagram representation of the filament formation step of the present invention.

Referring to FIG. 2, each virgin memristive device 100 must be individually "SET," transitioned from a high resistance state (HRS) to a low resistance state (LRS). This is done by applying a voltage bias to the TE 104 while grounding the common BE 102. This step changes the virgin memristive device 100 to a memristive device 110 by creating a filament 120 between the TE 104 and the BE 102. At this step, the filament 120 is a low resistance filament.

Figure 3:
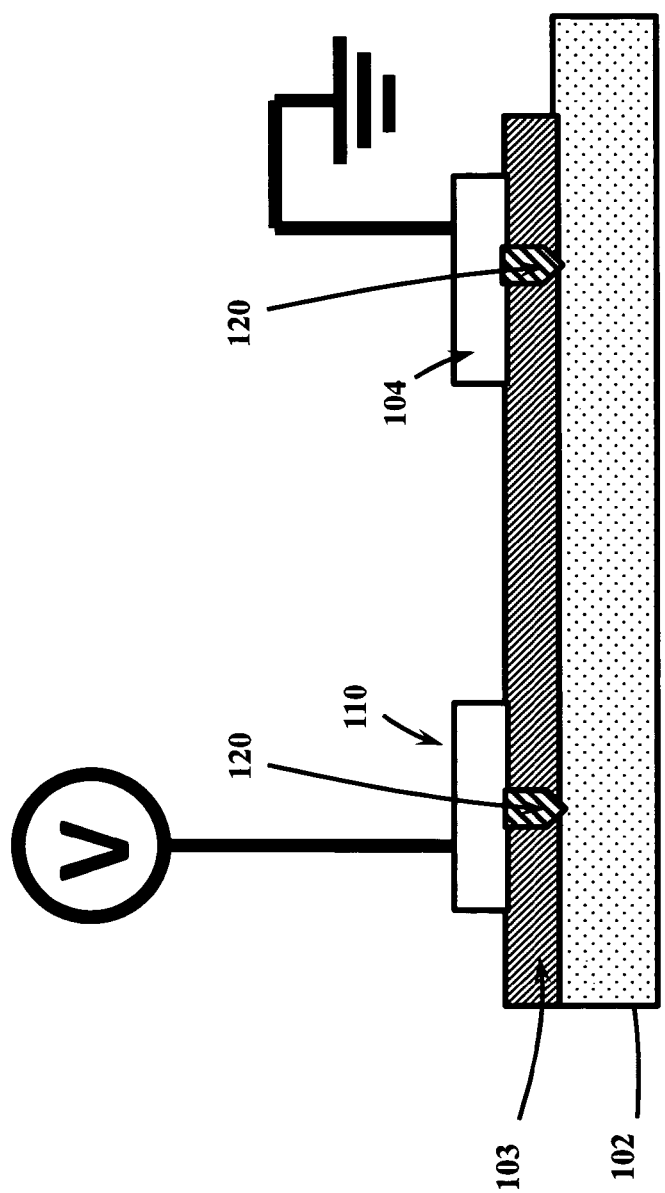
FIG. 3 is a schematic diagram representation of the initial state of the present invention during the truly random number generation step.

Referring to FIG. 3, the two memristive devices 110 are next treated as two devices in series, where one TE 104 is electrically biased and the other TE 104 is electrically grounded. In this setup, the BE is electrically floating. At this point, the measured resistance of this configuration will be equivalent to that of an LRS. To return this circuit configuration to an HRS, termed a "RESET," a different voltage bias is applied to one of the TE 104

Figure 4:
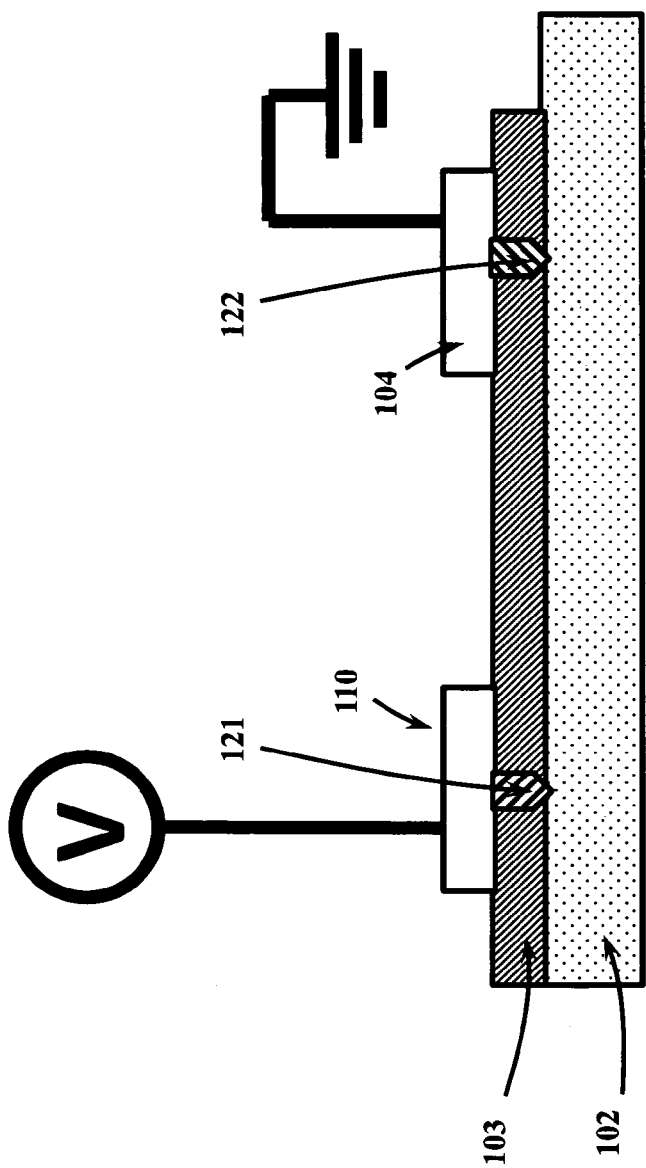
FIG. 4 is a schematic diagram representation of the state of the present invention following the truly random number generation step.

Referring to FIG. 4, during this RESET, one of the two low resistance filaments 120 (referring to FIG. 3) becomes a high resistance filament 121. The other filament becomes the persistent low resistance filament 122. Under which TE 104 (biased or grounded) the persistent low resistance filament manifests itself is dependent upon variations in the insulator layer 103. These variations result from processing non-uniformities and thus result in irreproducible film variations with every run. For all subsequent SET and RESET operation pairs, the location of persistent low resistance filament 122 does not change.

Figure 5:
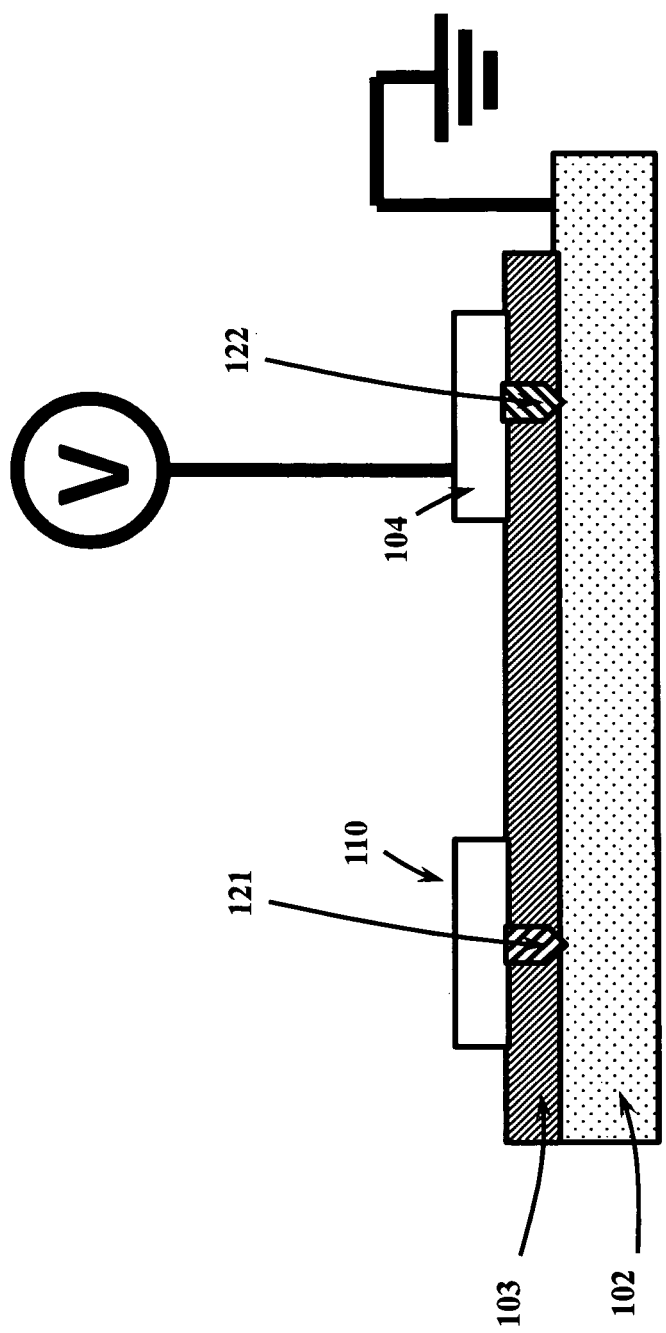
FIG. 5 is a schematic representation of the present invention being used to read the generated bit value.

Referring to FIG. 5, by this means a truly random bit may be generated, where one of the two memristors 110 serves as the generated bit value. If the vertically measured memristive device (TE 104 electrically biased, BE 102 grounded) has the persistent low resistance filament 122, then the generated bit is read as a logical "1." Conversely, if the memristive device has the high resistance filament 121, then the generated bit is read as a logical "0. The other memristive device 110 is subsequently ignored. This bit value is random since it cannot be determined ahead of time under which TE 104 of any two memristive devices the persistent low resistance filament 122 will occur. However, because the persistent low resistance filament 122 does not move for all subsequent SET and RESET operation pairs, the random bit is only random for the first SET and RESET operation pair.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hardware based random number generator, comprising:
   at least one memristor pair, comprising a first and a second memristive device;
   wherein
   each said memristive device has
      a top electrode;
      a bottom electrode; and
      an electrically insulating layer separating said top electrode from said bottom electrode;
   a first means for introducing a low resistance filament between said top electrode and said bottom electrode of said first memristive device;
   a second means for introducing a low resistance filament between said top electrode and said bottom electrode of said second memristor device;
   a third means for randomly causing
      one of said low resistance filaments to change state to a high resistance; and
      another of said low resistance filaments to change state to a persistent low resistance; and
   a fourth means for generating a random bit, said means further comprising means for determining the resistance of one of said resistance filaments.

2. The apparatus of claim 1, wherein said first means for introducing a low resistance filament between said top electrode and said bottom electrode further comprises:
   means for applying a voltage bias to said top electrode of said first memristor device while grounding said bottom electrode of said first memristor device.

3. The apparatus of claim 1, wherein said second means for introducing a low resistance filament between said top electrode and said bottom electrode further comprises:
   means for applying a voltage bias and current limit to said top electrode of said second memristor device while grounding said top electrode of said first memristor device.

4. The apparatus of claim 1, wherein said third means for randomly causing one of said low resistance filaments to change state to a high resistance and another of said low resistance filaments to change state to a persistent low resistance further comprises:
   means for applying a lower voltage bias and unlimited current to said top electrode of said second memristor device while grounding said top electrode of said first memristor device.

5. The apparatus of claim 1, wherein said fourth means for generating a random bit further comprises means for:
   assigning a logical "0" to said resistance filament with a high resistance; and
   assigning a logical "1" to said resistance filament with a low resistance.

6. The apparatus of claim 1, wherein said memristive pair is previously unused.

7. The apparatus of claim 1, wherein said bottom electrode is shared between said first and said second memristor in said at least one memristive pair.

8. A method for generating random numbers, comprising the steps of:
   fabricating at least one memristor pair, said pair comprising a first and a second memristive device;
      wherein said step of fabricating further comprises fabricating onto each said memristive device
         a top electrode;
         a bottom electrode; and an electrically insulating layer separating said top electrode from said bottom electrode;

introducing a low resistance filament between said top electrode and said bottom electrode of said first memristive device;

introducing a low resistance filament between said top electrode and said bottom electrode of said second memristor device;

randomly causing
one of said low resistance filaments to change state to a high resistance; and
another of said low resistance filaments to change state to a persistent low resistance; and
generating a random bit by determining the resistance of one of said resistance filaments.

9. The method of claim 8, wherein said step of introducing a low resistance filament between said top electrode and said bottom electrode further comprises the step of:
applying a voltage bias to said top electrode of said first memristor device while grounding said bottom electrode of said first memristor device.

10. The method of claim 8, wherein said step of introducing a low resistance filament between said top electrode and said bottom electrode further comprises the step of:
applying a voltage bias and current limit to said top electrode of said second memristor device while grounding said top electrode of said first memristor device.

11. The method of claim 8, wherein said step of randomly causing one of said low resistance filaments to change state to a high resistance and another of said low resistance filaments to change state to a persistent low resistance further comprises the step of:
applying a lower voltage bias and unlimited current to said top electrode of said second memristor device while grounding said top electrode of said first memristor device.

12. The method of claim 8, wherein said step of generating a random bit further comprises the steps of:
assigning a logical "0" to said resistance filament with a high resistance; and
assigning a logical "1" to said resistance filament with a low resistance.

13. The method of claim 8, wherein said at least one memristive pair is previously unused.

14. The method of claim 8, wherein said bottom electrode is shared between said first and said second memristor in said at least one memristive pair.

* * * * *

UNITED STATES PATENT AND TRADEMARK OFFICE
CERTIFICATE OF CORRECTION

PATENT NO.        : 8,680,906 B1
APPLICATION NO.   : 13/815157
DATED             : March 25, 2014
INVENTOR(S)       : Nathan McDonald et al.

Page 1 of 1

It is certified that error appears in the above-identified patent and that said Letters Patent is hereby corrected as shown below:

In the Specification

Column 1: line 21, the abbreviation "PRNG)" should be changed to -(PRNG)-; line 50, the formula "Al/CuO/Cu" should be changed to -Al/Cu$_x$O/Cu- Column 2: line 15, "FIRS" should be changed to -HRS- Signed and Sealed this
Tenth Day of June, 2014

Michelle K. Lee
*Deputy Director of the United States Patent and Trademark Office*